United States Patent [19]

Chiu et al.

[11] 3,839,257
[45] Oct. 1, 1974

[54] POLY(VINYLBENZYL TRIALKYL AMMONIUM HALIDE) SALT COMPOSITIONS

[75] Inventors: Thomas T. Chiu, Midland; Wendell N. Delano, Freeland, both of Mich.

[73] Assignee: The Dow Chemical Company, Midland, Mich.

[22] Filed: Aug. 22, 1973

[21] Appl. No.: 390,451

Related U.S. Application Data

[63] Continuation-in-part of Ser. No. 158,591, June 30, 1971, abandoned.

[52] U.S. Cl. .......... 260/29.6 HN, 117/201, 117/223, 117/DIG. 4
[51] Int. Cl. ............................................. C08f 45/24
[58] Field of Search ........................... 260/29.6 HN

[56] References Cited
UNITED STATES PATENTS
3,264,137  8/1966  Gess et al. ........................... 117/201

OTHER PUBLICATIONS
Darskus et al., J. Polymer, Sci. A3, 1941–42 (1965).

Takahashi et al., Nippon Kagaku Zasshi 83, 873–78 (1962).

Noda et al., Kogyo Kagaku Zasshi 67, 1423–28 (1964).

*Primary Examiner*—Melvin Goldstein
*Attorney, Agent, or Firm*—L. Wayne White

[57] ABSTRACT

The viscosity of aqueous solutions containing at least about 15 weight percent of a poly(vinylbenzyl trialkyl ammonium halide) can be increased by adding soluble non-deliquescent alkali or alkaline earth metal salts, such as NaCl. The resulting compositions are useful as electroconductive resins in electrostatic imaging processes. E.g., an electroconductive paper suitable for electrostatic imaging was prepared by coating paper with an aqueous solution of poly(vinylbenzyl trimethyl ammonium chloride) and NaCl, and thereafter removing the water by evaporation.

7 Claims, No Drawings

POLY(VINYLBENZYL TRIALKYL AMMONIUM HALIDE) SALT COMPOSITIONS

CROSS-REFERENCE TO RELATED APPLICATION

This application is a continuation-in-part of our co-pending application Ser. No. 158,591, filed June 30, 1971 and now abandoned.

BACKGROUND OF THE INVENTION

The use of electroconductive paper in electrostatic imaging is well known. Such paper is typically rendered electroconductive by coating a base paper stock with an organic, electroconductive resin.

Poly(vinylbenzyl trialkyl ammonium halides) are some of the best known commercial electroconductive resins. These resins are generally obtained by chloromethylating and subsequently aminating a polystyrene with, for example, trimethylamine. The products so prepared are water-soluble and bear up to one ammonium moiety per aromatic group. They typically are applied to paper as about 20–40 weight percent solutions, total weight basis, or formulated with clay and/or starch prior to application. Commercial techniques for applying coatings of such resin solutions and formulations require a minimum viscosity for best results. Solutions of from about 20 to about 40 weight percent, total weight basis, have been used with success. However, for economic reasons, it would be desirable to use less concentrated solutions and apply thinner coating and thus make more efficient use of the electroconductive resin providing that the quality of the coating (i.e., the degree of electroconductivity, color, etc.) was not impaired.

Thus, it is an object of this invention to provide aqueous solutions of poly(vinylbenzyl trialkyl ammonium halides) having a suitably high viscosity at lower resin concentrations which may be used in preparing electroconductive paper.

SUMMARY OF THE INVENTION

It has now been discovered that the viscosity of aqueous solutions containing at least about 15 weight percent of a poly(vinylbenzyl trialkyl ammonium halide), total weight basis, can be substantially increased by adding one or more soluble non-deliquescent alkali and alkaline earth metal salts to the aqueous solution. The solutions thus obtained are particularly useful in coating paper to form electroconductive paper suitable for use in electrostatic imaging.

This discovery was most surprising in view of the fact that water-soluble salts usually tend to lower the viscosity of aqueous polyelectrolytes. See, for example, Chapter VII entitled "Polyelectrolytes" in High Polymers, Vol. 21, Interscience (1965) by Morawetz.

Suitable salts for use herein are water-soluble, non-deliquescent alkali and alkaline earth metal salts having an atomic number of at least eleven (11). Examples of suitable such salts include the chloride, bromide, iodide, sulfate, nitrate and nitrite salts of sodium; the sodium and potassium borates, such as borax; the chloride, bromide, iodide and nitrate salts of potassium; the halide, nitrate and sulfate salts of rubidium; the bromide and sulfate salts of cesium; the chloride, sulfate and nitrate ($2H_2O$) salts of magnesium; calcium nitrate; the chloride, bromide, iodide and nitrate salts of strontium; and the like. The chlorides and bromides of sodium and potassium are the preferred salts. Sodium chloride is most preferred.

The amount of salt added can be varied to obtain any particular viscosity requirement. Amounts of from about 1 up to about 50 weight percent, based on dry polymer weight, are advantageous in preparing solutions to coat paper for electrostatic reproduction.

The poly(vinylbenzyl trialkyl ammonium halides) as noted above are prepared by chloromethylating and aminating a polystyrene. Such resins have up to one ammonium moiety per aromatic group and commonly have alkyl groups of from 1 to 4 carbon atoms attached to the ammonium nitrogen. The most common are poly(vinylbenzyl trimethyl ammonium chloride (or bromide)) and the analogous triethyl ammonium chloride (or bromide).

The viscosity of the subject resin/salt solutions tends to increase exponentially with increasing amounts of resin and/or salt in the solution and at higher concentrations the solutions become extremely viscous.

Other compounding ingredients, such as conventional paper coating agents, may also be included in the subject resin/salt solutions. For example, clay, starch, titanium dioxide, etc., may be slurried with the subject solution and applied directly to the base paper.

Specific Embodiments

The following examples further illustrate the invention.

Examples 1–4

In each example, a salt was dissolved in 100 g. of a 33.0 percent by weight, total weight basis, stock solution of poly(vinylbenzyl trimethyl ammonium chloride) in water and the viscosity of the solution measured using a Brookfield viscometer (Number 3 spindle; 25°C.; and 60 r.p.m.). The results are summarized in Table I.

TABLE I

| Example | Salts | Grams | Viscosity (cps.) |
|---|---|---|---|
| 1 | None | 0.0 | 140 |
| 2 | NaCl | 2.7 | 210 |
| 3 | NaCl | 6.0 | 440 |
| 4 | NaCl | 9.0 | 920 |

Formulated electroconductive coatings were prepared by mixing (a) an aliquot of each of the above test solutions (an amount sufficient to give 25 g. total solids); (b) 71.5 g. of a 70 weight percent clay suspension; and (c) 100 g. of a 25 weight percent starch suspension and sufficient water to reach a 250 g. total weight of formulation. The Brookfield viscosity (Number 4 spindle, 70°F., 20 r.p.m.) of the formulated coatings was measured and is reported in Table II. The formulated coatings were then applied to both sides of a precoated base stock (45 lbs. per ream, Kimberly-Clark), the coated paper dried at 220°F. for 3 minutes, and then conditioned for 16 hours under a constant relative humidity. The surface electrical resistivity (SER) of the coated sheets was measured and this data is likewise presented in Table II.

TABLE II

| Example | Viscosity | Coat-Weight* | Log (SER) 10% R.H.* | 50% R.H. |
|---|---|---|---|---|
| 1 | 4600 cps. | 1.96 | 10.107 | 8.314 |
| 1 | 4600 cps. | 1.55 | 10.280 | 8.385 |
| 4 | 5300 cps. | 1.9 | 10.110 | 8.278 |
| 4 | 5300 cps. | 1.55 | 10.108 | 8.316 |

*Coat Weight is expressed as pounds per 3,000 square feet of paper; and R.H. is relative humidity.

The lower the log (SER) value, the higher the conductance. Thus, from the above it will be seen that the presence of salt increases the viscosity of the formulated coatings and that the formulations are useful in preparing electroconductive paper.

Examples 5–13

In like manner except that a resin having a higher molecular weight was used, the following data in Table III was obtained.

TABLE III

| Example | Salts | Grams | Viscosity (cps.) |
|---|---|---|---|
| 5 | None | | 280 |
| 6 | NaCl | 2 | 690 |
| 7 | NaCl | 4 | 1300 |
| 8 | NaCl | 8 | 6600 |
| 9 | KCl | 2 | 580 |
| 10 | KCl | 5 | 1200 |
| 11 | KCl | 8 | 3050 |
| 12 | MgSO$_4$ | 8 | 1200 |
| 13 | NaNO$_3$ | 8 | ca. 10,000 |

The above compositions were likewise useful as coatings in making electroconductive paper.

Example 14

In yet another series of experiments, the concentration effect of the poly(vinylbenzyl trimethyl ammonium chloride) in the resin/salt solutions was determined. Sodium chloride was added (at a ratio of 1 part salt per 11 parts of resin) to aqueous solutions containing 10, 15, 20, 25, 30 and 33 weight percent resin, total weight basis. The viscosity of each solution was measured before and after the addition of the salt. The viscosity of the 10 weight percent solution decreased slightly upon the addition of salt. The viscosities of the remainder of the solutions increased by various amounts upon the addition of salt (i.e., from a slight increase with the 15 weight percent solution to double the viscosity with the 33 weight percent solution).

Example 15

The viscosity of three aliquots of a 33 weight percent solution of poly(vinylbenzyl trimethyl ammonium chloride) was increased from 140 cps. to 150, 200 and 240 cps. by the addition of 2.7, 6.0 and 9.0 grams of sodium acetate, respectively. These resin/salt solutions were similarly useful in preparing electroconductive paper by the method detailed in Example 1.

We claim:

1. A process for increasing the viscosity of a first aqueous solution containing at least 15 weight percent of a poly(vinylbenzyl trialkyl ammonium halide) comprising dissolving in said first solution a water-soluble non-deliquescent alkali or alkaline earth metal salt and thereby forming a second aqueous solution having a viscosity higher than said first solution; the cation of said salt having an atomic number of at least 11.

2. The process defined in claim 1 wherein said salt is at least one of the chloride, bromide, iodide, acetate nitrate or nitrite salts of sodium; sodium or potassium borates; the chloride, bromide, iodide or nitrate salts of potassium; the halide, nitrate, and sulfate salts of rubidium; the bromide and sulfate salts of cesium; the chloride, sulfate and nitrate salts of magnesium; calcium nitrate; or the chloride, bromide, iodide and nitrate salts of strontium.

3. The process defined in claim 1 wherein said salt is at least one of sodium chloride, sodium bromide, potassium chloride or potassium bromide.

4. The process defined in claim 1 wherein said salt is present in amounts of from about 1 to about 50 weight percent, based on the dry weight of poly(vinylbenzyl trialkyl ammonium halide).

5. The process defined in claim 3 wherein said poly(vinylbenzyl trialkyl ammonium halide) is poly(vinylbenzyl trimethyl ammonium chloride or bromide) or poly(vinylbenzyl triethyl ammonium chloride or bromide).

6. The process defined in claim 5 wherein said poly(vinylbenzyl trialkyl ammonium halide) is a poly(vinylbenzyl trimethyl ammonium chloride) prepared by chloromethylating and aminating a polystyrene and bears up TO one ammonium moiety per aromatic group; and wherein said salt is sodium chloride 7. The product produced by the process of claim 1.

* * * * *